United States Patent

Chou

(10) Patent No.: US 8,100,383 B2
(45) Date of Patent: Jan. 24, 2012

(54) VALVE ASSEMBLY

(75) Inventor: Hung-Chi Chou, Jhu-Bei (TW)

(73) Assignee: Tun Yi Industrial Co., Ltd., Jhu-Bei (TW)

( * ) Notice: Subject to any disclaimer, the term of this patent is extended or adjusted under 35 U.S.C. 154(b) by 558 days.

(21) Appl. No.: 12/326,194

(22) Filed: Dec. 2, 2008

(65) Prior Publication Data

US 2010/0038574 A1 Feb. 18, 2010

(30) Foreign Application Priority Data

Aug. 14, 2008 (TW) ................................ 97214567 U

(51) Int. Cl.
*F16K 31/44* (2006.01)

(52) U.S. Cl. .................................. 251/214; 251/315.06

(58) Field of Classification Search .................. 251/214, 251/315.01, 315.06, 286, 288
See application file for complete search history.

(56) References Cited

U.S. PATENT DOCUMENTS

| | | | | |
|---|---|---|---|---|
| 2,861,773 A | * | 11/1958 | Clade | 251/315.13 |
| 3,204,924 A | * | 9/1965 | Bredtschneider | 251/174 |
| 3,503,415 A | * | 3/1970 | Deangelis et al. | 137/375 |
| 3,593,960 A | * | 7/1971 | Scaramucci | 251/306 |
| 3,744,755 A | * | 7/1973 | Gary et al. | 251/309 |
| 4,201,239 A | * | 5/1980 | Kawamura | 137/72 |
| 4,893,781 A | * | 1/1990 | Kalain et al. | 251/214 |
| 5,232,200 A | * | 8/1993 | Combeau | 251/315.01 |
| 6,202,668 B1 | * | 3/2001 | Maki | 137/72 |
| 6,811,140 B1 | * | 11/2004 | Maini | 251/264 |
| 6,910,673 B2 | * | 6/2005 | Green et al. | 251/118 |

FOREIGN PATENT DOCUMENTS

FR 2559871 A1 * 8/1985

* cited by examiner

*Primary Examiner* — John Fristoe, Jr.
*Assistant Examiner* — Marina Tietjen
(74) *Attorney, Agent, or Firm* — Holland & Hart, LLP

(57) ABSTRACT

A valve assembly includes: a valve body defining an annular shoulder that is formed with an annular shoulder groove; a hollow ball member disposed in the valve body; a sealing unit including an O-ring received in the shoulder groove and protruding outwardly of the shoulder groove; a stem extending into the valve body to connect with the ball member and formed with an annular flange seated on the O-ring; an annular packing seated on the annular flange; and an annular pressing member defining an annular neck that cooperates with the annular shoulder to sandwich the annular flange, the O-ring and the annular packing therebetween. The pressing member is coupled adjustably to the valve body, and is adjustable to move toward and away from the O-ring.

6 Claims, 4 Drawing Sheets

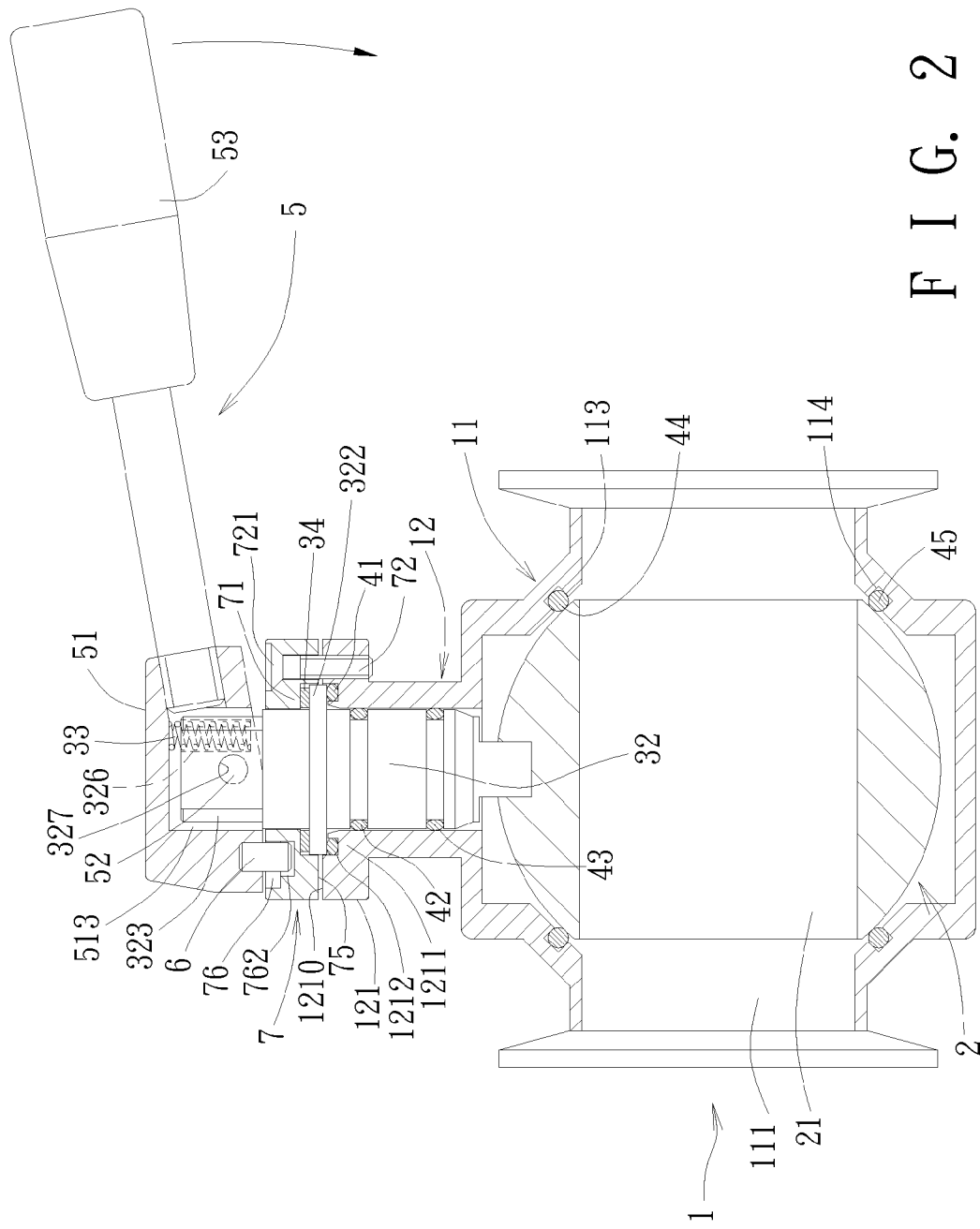
F I G. 2

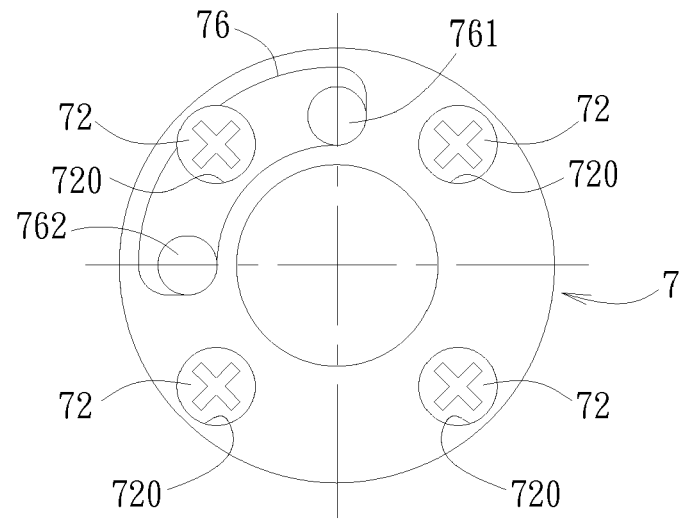
F I G. 4
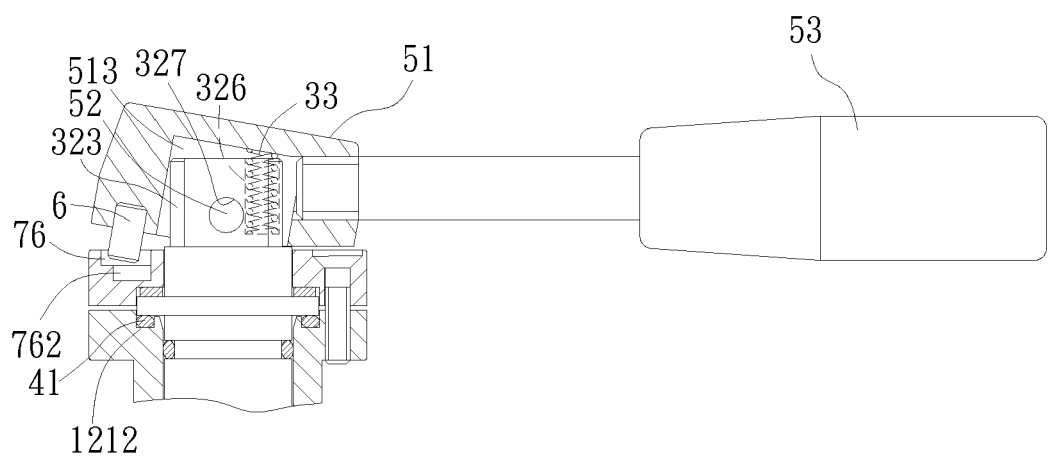
F I G. 5

VALVE ASSEMBLY

CROSS-REFERENCE TO RELATED APPLICATION

This application claims priority of Taiwanese application no. 097214567, filed on Aug. 14, 2008.

BACKGROUND OF THE INVENTION

1. Field of the Invention

The invention relates to a valve assembly, more particularly to a valve assembly including a valve body defining a shoulder, a stem formed with a flange, and an elastomeric O-ring sandwiched between and abutting sealingly against the flange and the shoulder through pressing action of a pressing unit.

2. Description of the Related Art

U.S. Pat. No. 4,558,874 discloses a conventional valve assembly (see FIG. 1) including: a valve body 81 formed with a stem-mounting hole and defining a fluid passage in fluid communication with the stem-mounting hole; a ball member 82 disposed movably in the valve body 81 and formed with a through-hole that is in fluid communication with the fluid passage when the ball member 82 is disposed at an opened position and that is not in fluid communication with the fluid passage when the ball member 82 is disposed at a closed position; an annular stem surrounding wall 83 fitted securely in the stem-mounting hole and formed with an inner flange 831; a stem bracket 84 secured to the stem surrounding wall 83; a stem 85 engaging threadedly the stem bracket 84, extending in an axial direction into and through the stem surrounding wall 83 to connect with the ball member 82 so as to drive rotation of the ball member 82 between the opened and closed positions, and formed with an outer flange 851 that is aligned with the inner flange 831 in the axial direction; an annular gland 86 having a portion disposed coaxially between the stem 85 and the stem surrounding wall 83; a support ring 861 disposed coaxially between the stem 85 and the stem surrounding wall 83 and abutting against the gland 86; an auxiliary packing member 87 sandwiched between and abutting against the inner and outer flanges 831, 851; and a main packing member 88 sandwiched between and abutting against the support ring 861 and the inner flange 831. The main packing member 88 includes first and second packing elements 881, 882 respectively having inclined first and second slippage surfaces that are in slipping engagement with each other. A pressing member 89 engages threadedly the stem 85 to press against a spring washer 891, which, in turn, presses against the gland 86 and the support ring 861, thereby providing an axial force acting on the main packing member 88 such that the first and second packing elements 881, 882 are compressed and expand radially to abut sealingly against the stem 85 and the stem surrounding wall 83.

Although the aforesaid conventional valve assembly can provide effective sealing, it has a relatively complex configuration and the rotational friction between the stem 85 and the main packing member 88 is still relatively large, which results in a relatively high wearing rate for the main packing member 88 and thus a decrease in the service life of the valve assembly.

SUMMARY OF THE INVENTION

Therefore, an object of the present invention is to provide a valve assembly that can overcome the aforesaid drawbacks of the prior art.

According to the present invention, there is provided a valve assembly that comprises: a valve body having a valve surrounding wall and a stem surrounding wall, the stem surrounding wall extending from the valve surrounding wall and having an enlarged head portion, the head portion being disposed distal from the valve surrounding wall and having an annular shoulder that is formed with an annular shoulder groove; a hollow ball member disposed in the valve surrounding wall; a sealing unit including an elastomeric O-ring received in the annular shoulder groove and protruding outwardly of the shoulder groove; a stem extending in an axial direction through the stem surrounding wall and into the valve surrounding wall to connect securely with the ball member for driving rotation of the ball member about a vertical axis defined by the stem, the stem being formed with an annular flange that radiates outwardly therefrom and that is seated on the O-ring; an annular packing seated on the annular flange and disposed opposite to the O-ring in the axial direction; and a pressing unit including an annular pressing member surrounding the stem and defining an annular neck that abuts against the annular packing, that is aligned with the annular shoulder in the axial direction, and that cooperates with the annular shoulder to sandwich the annular flange, the O-ring and the annular packing therebetween. The pressing member is coupled adjustably to the head portion of the stem surrounding wall, and is adjustable to move in the axial direction toward and away from the O-ring so as to apply an appropriate axial force to press the O-ring to abut sealingly against the annular flange of the stem and the annular shoulder of the head portion of the stem surrounding wall.

BRIEF DESCRIPTION OF THE DRAWINGS

Other features and advantages of the present invention will become apparent in the following detailed description of the preferred embodiment with reference to the accompanying drawings, of which:

FIG. 2 is a sectional view of the preferred embodiment of a valve assembly according to this invention;

FIG. 4 is a schematic top view of a pressing member of the preferred embodiment; and FIG. 5 is a fragmentary sectional view illustrating how a stem is locked and unlocked through a locking protrusion of a connecting portion of a handle of the preferred embodiment.

DETAILED DESCRIPTION OF THE PREFERRED EMBODIMENT

Figure 1:
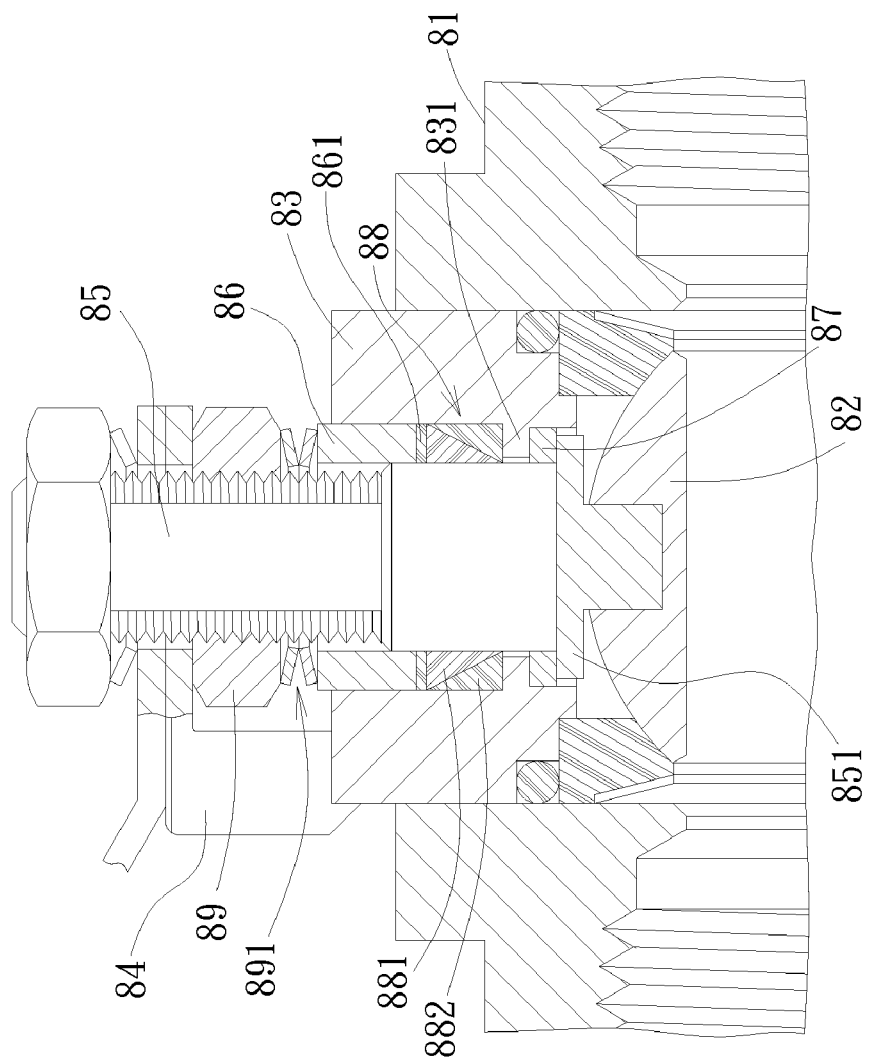
FIG. 1 is a fragmentary sectional view of a conventional valve assembly disclosed in U.S. Pat. No. 4,558,874.
Figure 3:
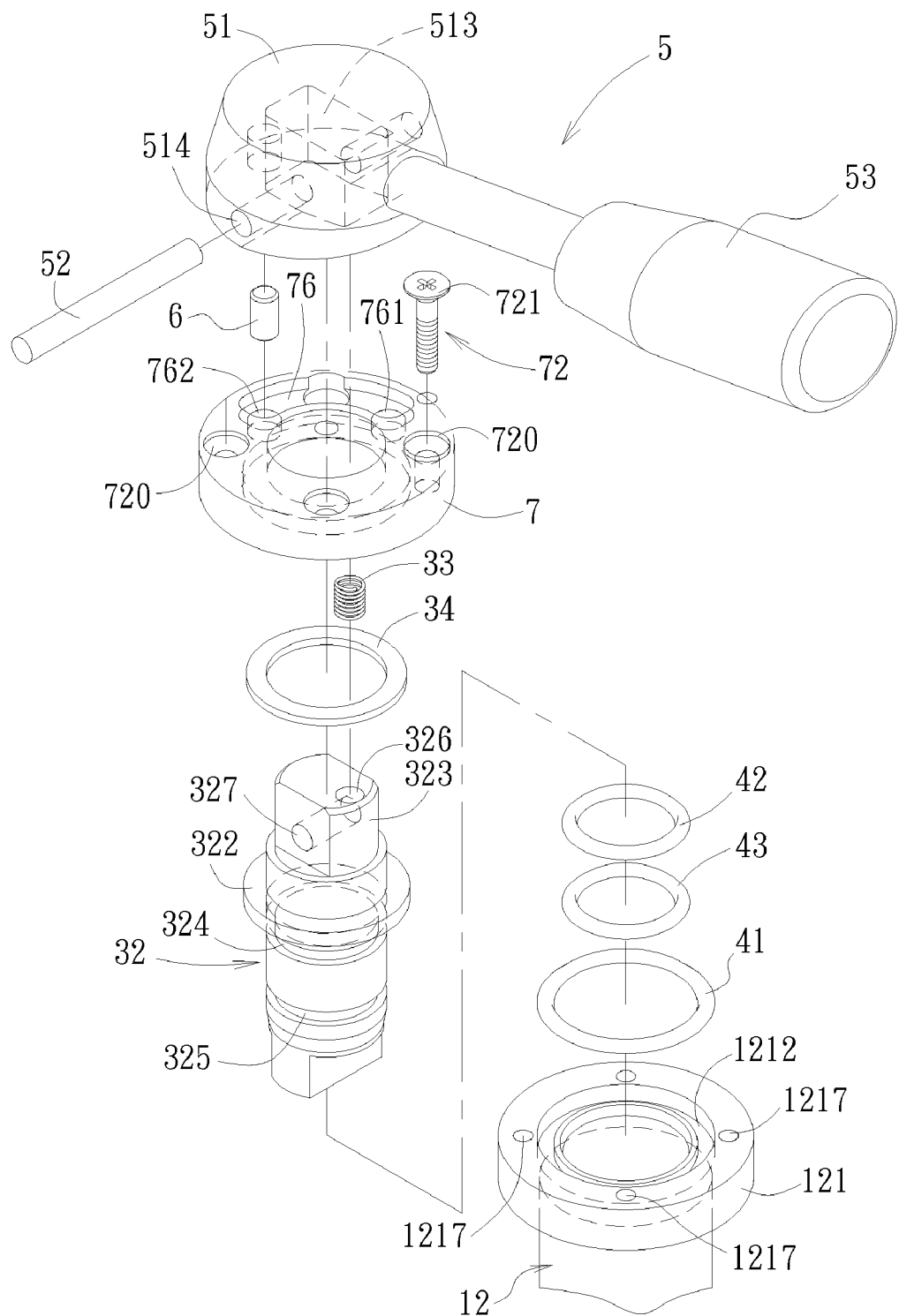
FIG. 3 is a fragmentary exploded perspective view of the preferred embodiment.

Referring to FIGS. 2 to 4, the preferred embodiment of a valve assembly according to the present invention is a ball valve and is shown to include: a valve body 1 having a valve surrounding wall 11 and a stem surrounding wall 12, the valve surrounding wall 11 defining a fluid passage 111 therein, the stem surrounding wall 12 extending from the valve surrounding wall 11 in a transverse direction relative to the fluid passage 111 and having a shank portion and an enlarged head portion 121 enlarged from the shank portion, the head portion 121 being disposed distal from the valve surrounding wall 11 and having an annular shoulder 1211 that radiates outwardly from the shank portion and that is formed with an annular shoulder groove 1212; a hollow ball member 2 disposed in the valve surrounding wall 11 and formed with a through-hole 21 that is in fluid communication with the fluid passage 111 when the ball member 2 is disposed at an opened position (see FIG. 2), and that is not in fluid communication with the fluid passage 111 when the ball member 2 is disposed at a closed position (not shown); a sealing unit including an elastomeric first O-ring 41 received in the shoulder groove 1212 and protruding outwardly of the shoulder groove 1212; a stem 32 extending in an axial direction through the stem surrounding wall 12 and into the valve surrounding wall 11 to connect securely with the ball member 2 for driving rotation of the ball member 2 about a vertical axis defined by the stem 32, the stem 32 being formed with an annular flange 322 that radiates outwardly therefrom and that is seated on the first O-ring 41; an annular packing 34 seated on the annular flange 322 and disposed opposite to the first O-ring 41 in the axial direction; and a pressing unit including an annular pressing member 7 surrounding the stem 32 and defining an annular neck 71 that abuts against the annular packing 34, that is aligned with the annular shoulder 1211 in the axial direction, and that cooperates with the annular shoulder 1211 to sandwich the annular flange 322, the first O-ring 41 and the annular packing 34 therebetween. The pressing member 7 is coupled adjustably to the head portion 121 of the stem surrounding wall 12, and is adjustable to move in the axial direction toward and away from the first O-ring 41 so as to apply an appropriate axial force to press the first O-ring 41 to abut sealingly and axially against the annular flange 322 of the stem 32 and the annular shoulder 1211 of the head portion 121 of the stem surrounding wall 12 and to deform the first O-ring 41 to expand radially to thereby abut radially and sealingly against a groove-defining wall that defines the shoulder groove 1212.

In this embodiment, the pressing unit further includes a plurality of fasteners 72 extending axially and respectively through screw holes 720 in the pressing member 7 and into screw holes 1217 in the head portion 121 of the stem surrounding wall 12 to engage threadedly the head portion 121 of the stem surrounding wall 12. Each of the fasteners 72 is preferably in the form of a screw, and has an enlarged head 721 that abuts against the pressing member 7 so as to permit position adjustment of the pressing member 7 in the axial direction toward and away from the first O-ring 41 and deformation of the first O-ring 41 to a predetermined extent corresponding to an inner working pressure in the valve body 1. Note that the pressing member 7 has a bottom end face 75 confronting and spaced apart from a top end face 1210 of the head portion 121 of the stem surrounding wall 12 by a gap. In one preferred embodiment, the gap is within a range of from 0.2 mm to 0.3 mm, and the inner working pressure in the valve body 1 can reach a vacuum of $5 \times 10^{-9}$ mbar.

In this embodiment, the stem 32 is further formed with an annular first groove 324 and an annular second groove 325 that is axially spaced apart from the first groove 324. The sealing unit further includes an elastomeric second O-ring 42 received in the first groove 324 and protruding outwardly of the first groove 324 to abut sealingly against the stem surrounding wall 12, and an elastomeric third O-ring 43 received in the second groove 325 and protruding outwardly of the second groove 325 to abut sealingly against the stem surrounding wall 12.

The valve surrounding wall 11 is formed with annular upper and lower grooves 113, 114. The sealing unit further includes elastomeric upper and lower O-rings 44, 45 that are received in the upper and lower grooves 113, 114 and that protrude outwardly of the upper and lower grooves 113, 114, respectively, to abut sealingly against the ball member 2.

In this embodiment, the pressing member 7 is formed with an arc-shaped recess 76 and first and second retaining holes 761, 762 that are in spatial communication with the arc-shaped recess 76 and that are disposed respectively at two opposite ends of the arc-shaped recess 76. The valve assembly further includes a handle 5 having a connecting portion 51 and a grip portion 53 extending from the connecting portion 51. The connecting portion 51 is pivoted to the stem 32 through a pivot pin 52 so as to be rotatable about a horizontal axis relative to the stem 32 between locking and releasing positions (see FIGS. 2 and 5). The connecting portion 51 is provided with a locking protrusion 6 protruding therefrom. The locking protrusion 6 engages an aligned one of the first and second retaining holes 761, 762 in the pressing member 7 when the connecting portion 51 is disposed at the locking position, thereby preventing rotation of the stem 32 and the ball member 2 about the vertical axis. The locking protrusion 6 is disengaged from the aligned one of the first and second retaining holes 761, 762 in the pressing member 7 when the connecting portion 51 is disposed at the releasing position, thereby permitting rotation of the stem 32 and the ball member 2 about the vertical axis between the opened and closed positions.

The connecting portion 51 of the handle 5 is formed with a non-circular insert hole 513. The stem 32 has a non-circular top end portion 323 that is inserted into the non-circular insert hole 513 in the connecting portion 51. The pivot pin 52 extends through a hole 514 in the connecting portion 51 and a hole 327 in the top end portion 323 of the stem 32. The top end portion 323 of the stem 32 is further formed with a spring-retaining hole 326. The valve assembly further includes an urging member 33 disposed in the spring-retaining hole 326 and abutting against the top end portion 323 of the stem 32 and the connecting portion 51 of the handle 5 for restoring the connecting portion 51 of the handle 5 to the locking position.

With the inclusion of the first O-ring 41, the head portion 121 of the stem surrounding wall 12, the annular flange 322 of the stem 32, and the annular neck 71 of the pressing member 7 in the valve assembly of this invention, the valve assembly can provide excellent sealing under a relatively high vacuum condition in the valve body 1, and the aforesaid drawbacks associated with the aforementioned conventional valve assembly can be alleviated.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:
1. A valve assembly comprising:
a valve body having a valve surrounding wall and a stem surrounding wall, said stem surrounding wall extending from said valve surrounding wall and having an enlarged head portion, said head portion being disposed distal from said valve surrounding wall and having an annular shoulder that is formed with an annular shoulder groove;
a hollow ball member disposed in said valve surrounding wall;
a sealing unit including an elastomeric first O-ring received in said shoulder groove and protruding outwardly of said shoulder groove;
a stem extending in an axial direction through said stem surrounding wall and into said valve surrounding wall to connect securely with said ball member for driving rotation of said ball member about a vertical axis defined by said stem, said stem being formed with an annular flange that radiates outwardly therefrom and that is seated on said first O-ring;

an annular packing seated on said annular flange and disposed opposite to said first O-ring in the axial direction; and a pressing unit including an annular pressing member surrounding said stem and defining an annular neck that abuts against said annular packing, that is aligned with said annular shoulder in the axial direction, and that cooperates with said annular shoulder to sandwich said annular flange, said first O-ring and said annular packing therebetween, said pressing member being coupled adjustably to said head portion of said stem surrounding wall and being adjustable to move in the axial direction toward and away from said first O-ring so as to apply an appropriate axial force to press said first O-ring to abut sealingly against said annular flange of said stem and said annular shoulder of said head portion of said stem surrounding wall;

wherein said pressing member is formed with an arc-shaped recess and first and second retaining holes that are in spatial communication with said arc-shaped recess and that are disposed respectively at two opposite ends of said arc-shaped recess, said valve assembly further comprising a handle having a connecting portion and a grip portion extending from said connecting portion, said connecting portion being pivoted to said stem so as to be rotatable about a horizontal axis relative to said stem between locking and releasing positions, said connecting portion being provided with a locking protrusion protruding therefrom, said locking protrusion engaging an aligned one of said first and second retaining holes in said pressing member when said connecting portion is disposed at said locking position, thereby preventing rotation of said stem about said vertical axis, said locking protrusion disengaging the aligned one of said first and second retaining holes in said pressing member when said connecting portion is disposed at said releasing position, thereby permitting rotation of said stem about said vertical axis.

2. The valve assembly as claimed in claim 1, wherein said stem is further formed with an annular first groove, said sealing unit further including an elastomeric second O-ring received in said first groove and protruding outwardly of said first groove to abut sealingly against said stem surrounding wall.

3. The valve assembly as claimed in claim 2, wherein said stem is further formed with an annular second groove that is axially spaced apart from said first groove, said sealing unit further including an elastomeric third O-ring received in said second groove and protruding outwardly of said second groove to abut sealingly against said stem surrounding wall.

4. The valve assembly as claimed in claim 1, wherein said valve surrounding wall is formed with annular upper and lower grooves, said sealing unit further including elastomeric upper and lower O-rings that are received in said upper and lower grooves and that protrude outwardly of said upper and lower grooves, respectively, to abut sealingly against said ball member.

5. The valve assembly as claimed in claim 1, wherein said pressing unit further includes a plurality of fasteners extending axially through said pressing member to engage threadedly said head portion of said stem surrounding wall, each of said fasteners having an enlarged head that abuts against said pressing member so as to permit position adjustment of said pressing member in the axial direction toward and away from said first O-ring and deformation of said first O-ring to a predetermined extent corresponding to an inner working pressure in said valve body.

6. The valve assembly as claimed in claim 1, wherein said connecting portion of said handle is formed with a non-circular insert hole, said stem having a non-circular top end portion that is inserted into said non-circular insert hole in said connecting portion, said top end portion of said stem being formed with a spring-retaining hole, said valve assembly further comprising an urging member disposed in said spring-retaining hole and abutting against said top end portion of said stem and said connecting portion of said handle for restoring said connecting portion to said locking position.

* * * * *